United States Patent [19]

Irwin et al.

[11] 4,213,652

[45] Jul. 22, 1980

[54] LINEAR LOCKING SEAT BELT RETRACTOR

[75] Inventors: Clarence C. Irwin, Sterling Heights; David F. Manz, Bloomfield Hills; John T. Auman, Washington, all of Mich.

[73] Assignee: General Motors Corporation, Detroit, Mich.

[21] Appl. No.: 914,621

[22] Filed: Jun. 12, 1978

[51] Int. Cl.² .................. A62B 35/00; B60R 21/10
[52] U.S. Cl. .................. 297/478; 280/804; 280/806; 297/479
[58] Field of Search .......... 280/744, 745, 746, 747, 280/808, 806, 802, 803, 804, 801, 807, 805; 297/385, 386, 387, 388, 389, 468, 478, 469, 474, 483, 486; 242/107.4 B, 107.4 R, 107.4 A

[56] References Cited

U.S. PATENT DOCUMENTS

| | | | |
|---|---|---|---|
| 3,058,687 | 10/1962 | Bentley | 242/107.4 B |
| 3,292,744 | 12/1966 | Replogle | 297/479 X |
| 3,439,932 | 4/1969 | Lewis et al. | 280/806 X |
| 3,526,431 | 9/1970 | Boedigheimer et al. | 297/479 |
| 3,535,001 | 10/1970 | Lewis et al. | 297/470 |
| 3,557,914 | 1/1971 | Tanaka | 297/479 X |
| 3,610,361 | 10/1971 | Pringle | 280/806 X |
| 3,645,549 | 2/1972 | Jantzen | 280/807 |
| 3,667,805 | 6/1972 | Apri | 297/480 |
| 3,667,806 | 6/1972 | Sprecher | 297/479 |
| 3,770,078 | 11/1973 | Keppel et al. | 280/803 |
| 3,869,173 | 3/1975 | Haller et al. | 297/479 |
| 4,057,200 | 11/1977 | Ubukata et al. | 242/107.4 A |

Primary Examiner—John J. Love
Assistant Examiner—Milton L. Smith
Attorney, Agent, or Firm—Charles E. Leahy

[57] ABSTRACT

Mechanism for retracting a vehicle seat belt and locking the belt against extension includes a track mounted on the vehicle body and a belt carriage mounted on the track for movement in the belt extending and retracting directions. A locking pawl is mounted on the belt carriage and is selectively actuatable to a locked position engaging teeth on the track to lock the belt carriage against belt extending movement. A spring biased reel mounted on the vehicle body winds a cable having its end attached to the locking pawl so that winding of the cable urges the carriage in the belt retracting direction. A reel locking means selectively locks the reel against rotation in the cable unwinding direction so that the cable is tensioned upon attempted extension of the belt to actuate the pawl to the locked position. The reel locking means may be responsive to the rate of belt unwinding or a condition of vehicle deceleration.

3 Claims, 6 Drawing Figures

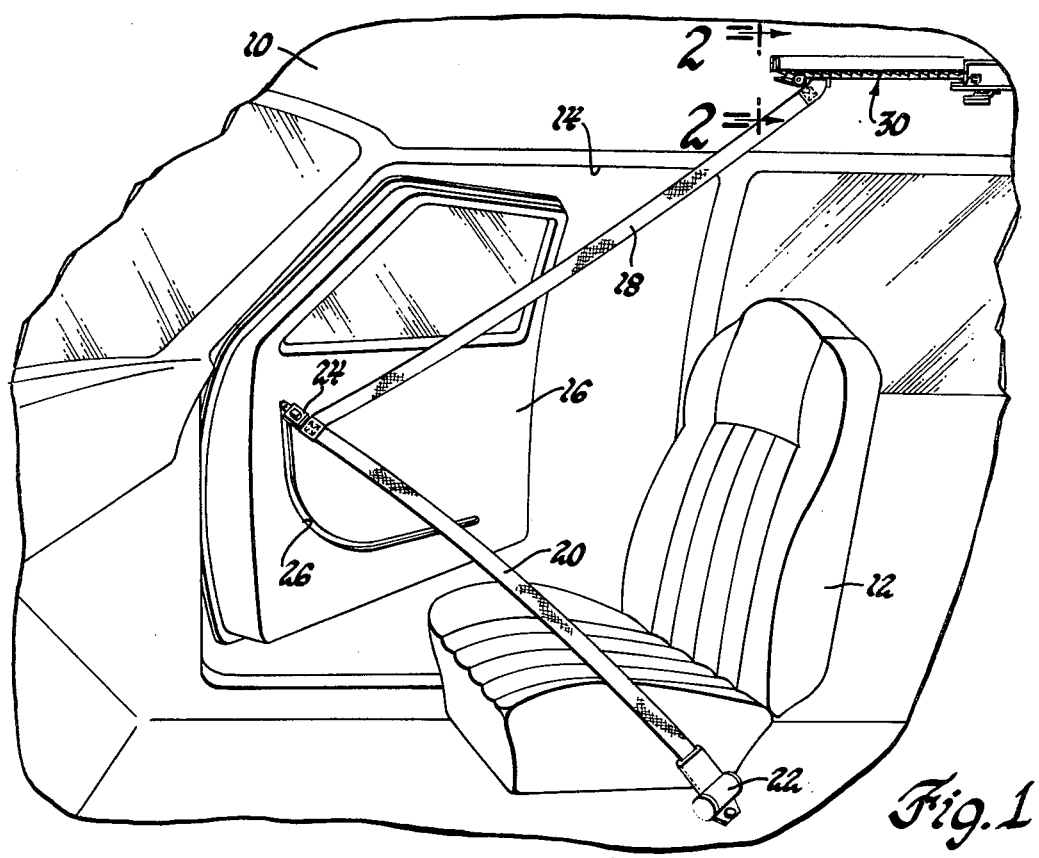
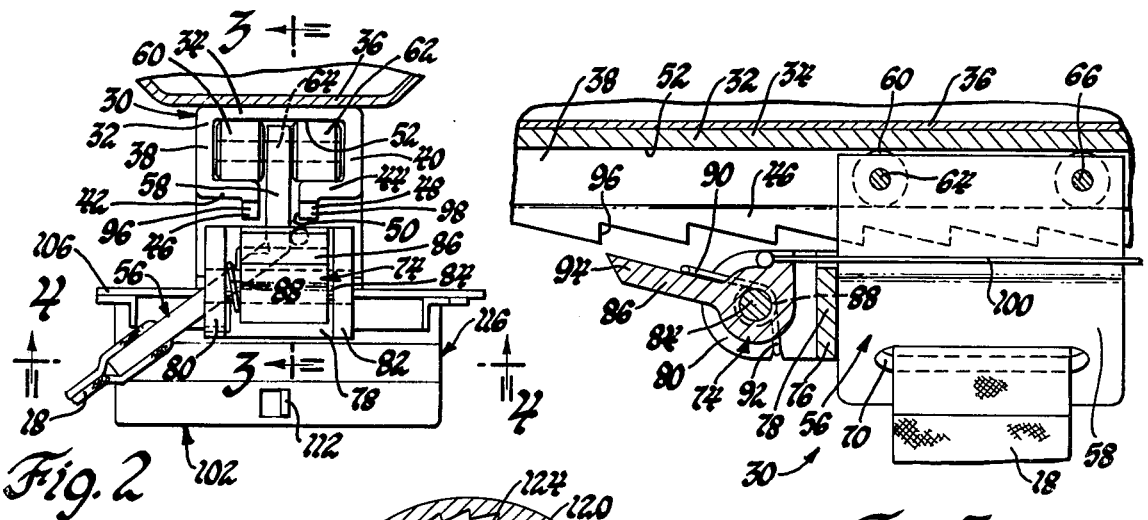
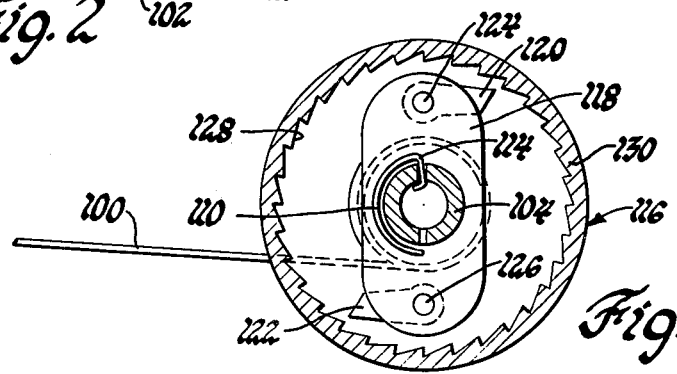

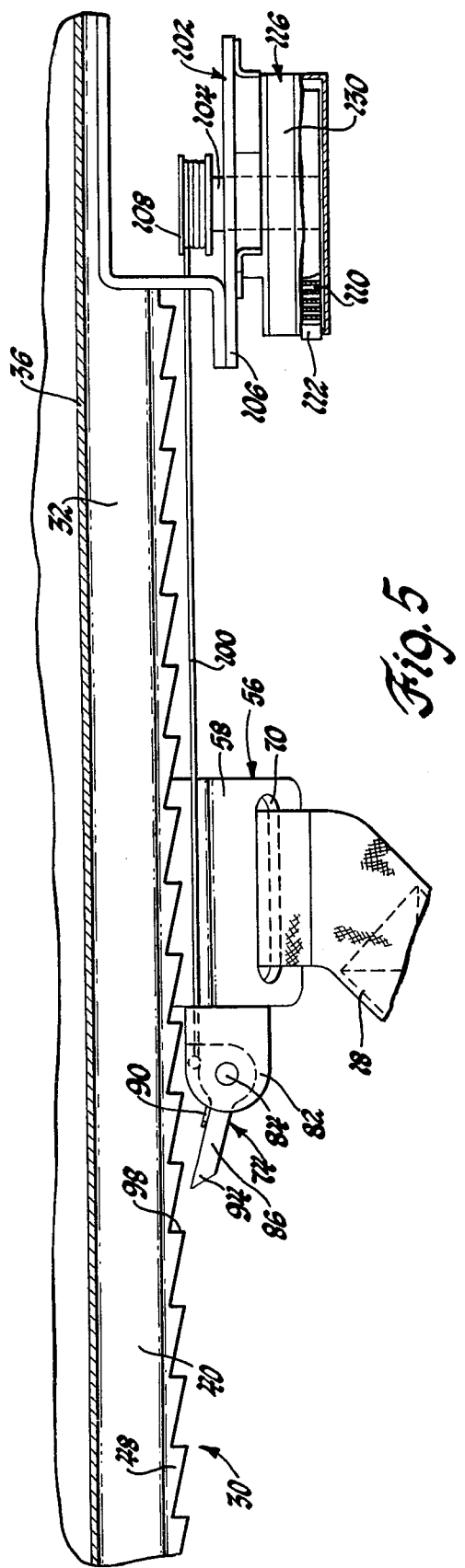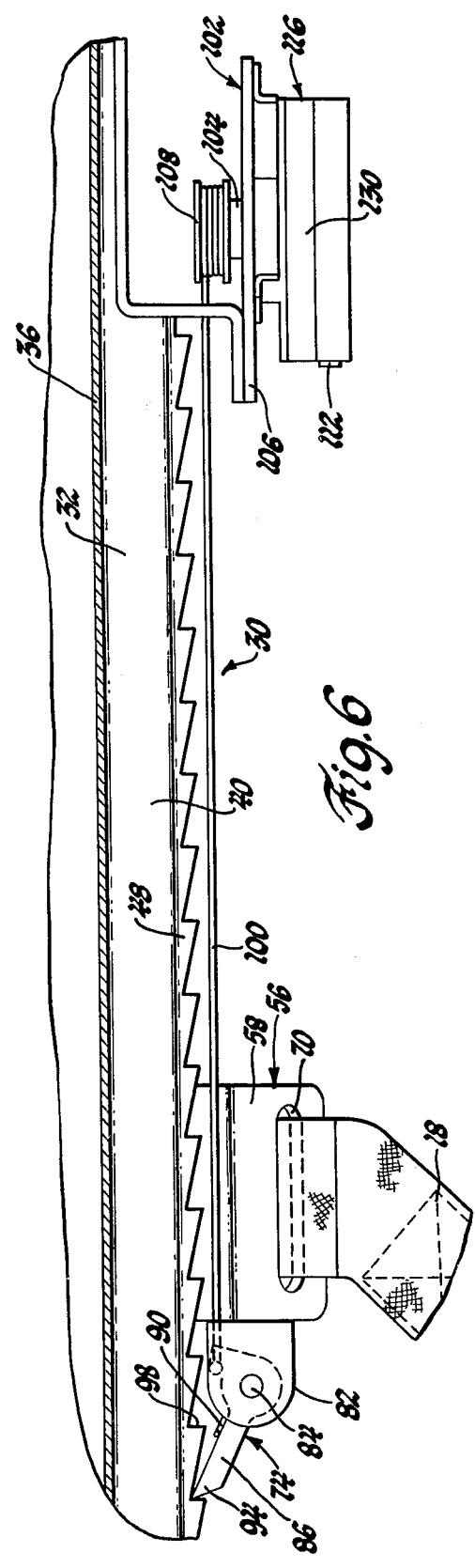

LINEAR LOCKING SEAT BELT RETRACTOR

The invention relates to a seat belt retractor and more particularly to a seat belt retractor wherein a belt end is moved along a linear path by a track mounted carriage having associated locking means selectively actuatable to lock the carriage and thereby prevent belt extension.

BACKGROUND OF THE INVENTION

It is well known to mount the end of a seat belt on a vehicle body via a linear belt retracting mechanism including a carriage movable on a track. The carriage is typically moved in a belt retracting direction by a cable connecting the carriage with a spring biased reel for winding the cable. A lock is provided to selectively prevent belt extension and is preferably a pawl or the like mounted on the carriage and selectively actuatable to engage the track. The lock is operated by a sensing means responsive to a condition of rapid belt unwinding or a condition of predetermined vehicle acceleration. The sensing means is preferably located at a fixed point on the vehicle body instead of on the moving carriage.

BRIEF SUMMARY OF THE INVENTION

The present invention provides a new and improved means for transmitting a locking signal from a sensing means located at a fixed location on the vehicle body to a belt carriage which is movable relative the vehicle body. More particularly, the invention provides a seat belt retracting and locking mechanism including a track mounted on the vehicle body and a belt carriage mounted on the track for movement therealong in the belt extending and retracting directions. A locking pawl is mounted on the belt carriage and is actuatable to a locked position engaging teeth on the track to lock the belt carriage against belt extending movement. The locking pawl is spring biased to an unlocking position. A spring biased reel is mounted at a fixed location relative the vehicle body and winds a cable having its end attached to the locking pawl. Winding of the cable by the spring biased reel urges movement of the carriage along the track in the belt retracting direction. A reel locking means is associated with the reel to selectively lock the reel against rotation in the cable unwinding direction. Locking of the reel and attempted extension of the belt tensions the cable to actuate the locking pawl to the locked position and thereby lock the carriage against further belt extending movement. The reel locking means may be any suitable prior art reel lock including a lock responsive to belt unwinding or a lock responsive to a condition of vehicle deceleration.

One object, feature and advantage of the present invention resides in the provision of a linear locking retractor wherein a lock associated with a belt carriage movable along a track is mechanically linked to a suitable vehicle inertia sensor or belt unwinding sensor mounted at a fixed location on the vehicle body.

Another object, feature and advantage of the present invention resides in the provision of a linear locking retractor wherein a cable extends between a locking pawl mounted on a movable belt carriage and a spring biased reel having associated condition sensing lock-up means so that the cable pulls the carriage in the belt retracting direction and actuates the locking pawl to the carriage locking condition when the reel is locked by its associated condition sensing means.

BRIEF SUMMARY OF THE DRAWINGS

These and other objects, features and advantages of the invention will become apparent upon consideration of the appended specification and the appended drawings in which:

FIG. 1 is a perspective view of the vehicle body having a passive seat belt system employing a linear locking retractor according to the invention;

FIG. 2 is a sectional view taken in the direction of arrows 2—2 of FIG. 1;

FIG. 3 is a sectional view taken in the direction of arrows 3—3 of FIG. 2;

FIG. 4 is a sectional view taken in the direction of arrows 4—4 of FIG. 2;

FIG. 5 is a side elevation view of the linear locking retractor in the unlocked condition; and FIG. 6 is a view similar to FIG. 5 but showing the linear locking retractor in the locked position to prevent belt extension.

DESCRIPTION OF THE PREFERRED EMBODIMENT

Referring to FIG. 1, there is shown a vehicle body generally indicated at 10 having a conventional vehicle seat 12 mounted therein. The vehicle body includes a door opening 14 which is selectively opened and closed by a door 16 having its forward end pivoted to the vehicle body for movement between the open position shown in FIG. 1 and a closed position.

An occupant restraining belt system is provided in the vehicle body 10 to restrain an occupant in the vehicle seat 12. The restraint system includes a shoulder belt 18 and a lap belt 20. The inboard end of lap belt 20 is attached to the vehicle floor adjacent the inboard side of the seat by a conventional seat belt retractor 22. The retractor 22 has a reel which is spring biased to wind the lap belt 20 thereon and has an associated locking mechanism for selectively locking the reel against rotation in belt unwinding direction. The locking mechanism of the retractor 22 may be locked in response to deceleration of the vehicle or by rapid unwinding of the belt.

The outboard end of belt 20 is connected to an emergency release buckle 24 which is in turn attached to the door 16 by a suitable mechanism which traverses a track 26 in the door 16 to move the outboard end of the lap belt 20 between the FIG. 1 door-open position disposing the lap belt 20 forwardly of the occupant to facilitate ingress and egress and a rearward door-closed position in which the belt is positioned across the lap of the occupant. Reference may be had to U.S. Pat. No. 3,770,078, issued Nov. 6, 1973 to Keppel et al and assigned to the assignee of this invention for disclosure of a suitable mechanism for moving the buckle 24 and outboard lap belt end along the track 26.

The outboard end of shoulder belt 18 is sewn to the outboard end of lap belt 20 adjacent the emergency release buckle 24. The inboard end of shoulder belt 18 is attached to the vehicle roof at a location inboard and above the seated occupant by a linear locking seat belt retractor 30 of this invention.

Referring to FIGS. 2 and 3, it is seen that the linear locking retractor 30 includes a channel-shaped track 32 which includes a base wall 34 attached to the vehicle roof panel 36 and a pair of laterally spaced depending legs 38 and 40. A pair of flanges 42 and 44 project inwardly toward one another from the depending legs 38 and 40 and have spaced apart downwardly depending legs 46 and 48 cooperating to define a downwardly opening slot 50 which opens into a cavity 52 defined by the track 32.

Referring again to FIGS. 2 and 3, it is seen that a belt carriage generally indicated at 56 is mounted for movement along the track 32. The belt carriage includes a bracket 58 which enters the slot 50 of track 32. Referring to FIG. 2, it is seen that a pair of rollers 60 and 62 are attached to the forward end of bracket 58 by an axle shaft 64. Referring to FIG. 3, it is seen that similar axle shaft 66 is provided at the rearward end of bracket 58 for mounting an additional pair of rollers. The rollers fit closely within the confines of the cavity 52 of the track 32 and bear on the track flanges 42 and 44 to support the bracket 58 for fore and aft movement along the track 32. The lower end of the bracket 58 angles toward the door 16 and has a slot 70 through which the shoulder belt 18 is attached.

Referring again to FIGS. 2 and 3, it is seen that a locking mechanism indicated generally at 74 is provided on the carriage 56. The locking mechanism 74 includes a frame 76 having a base wall 78 suitably welded or otherwise attached to the bracket 58 and a pair of laterally spaced legs 80 and 82. A pivot shaft 84 extends between the legs 80 and 82 to pivotally mount a pawl 86. A torsion spring 88 encircles the pivot shaft 84 and has a leg 90 engaging the pawl 86 and a leg 92 engaging the leg 80 to urge the pawl 86 to a normal position shown in FIG. 3 wherein a pawl tooth 94 at the end of the pawl 86 is spaced away from engagement with a plurality of longitudinally spaced teeth 96 and 98 formed on the downwardly depending legs 46 and 48 of the track 32.

Referring to FIGS. 5 and 6, it is seen that the belt carriage 56 is urged in the rearward direction by a cable 100 or similar flexible element which extends between the pawl 86 and a reel assembly generally indicated at 102. The reel assembly 102 includes a shaft 104 which is mounted for rotation on a mounting bracket 106 suitably attached to the track 32 or the vehicle roof panel 36. A reel 108 is attached to the end of the shaft 104 and has the end of cable 100 attached thereto for winding and unwinding the cable 100 upon rotation of the reel 108 with the shaft 104. A spiral spring 110 has its outer end 112 attached to a spring housing associated with mounting bracket 106 and its inner end 114 attached to the shaft 104 as seen in FIG. 4. Spring 110 urges rotation of the shaft 104 in the direction to wind the cable 100 on the reel 108 and retract the carriage in the rearward direction. Forward belt extending movement of the carriage 56 unwinds cable 100 from the reel 108 and winds up the spring 110 to store energy for subsequent rearward retreival of the carriage 56.

Referring to FIG. 4, it is seen that a reel locking mechanism, generally indicated at 116, includes a plate 118 fixedly attached to the shaft 104 for rotation therewith and having a pair of pawls 120 and 122 mounted thereon by respective pivot pins 124 and 126. A spring, not shown, of predetermined bias is associated with the pawls 120 and 122 urging them toward a normal position shown in FIG. 4. Rapid unwinding of the cable 100 from the reel 108 induces centrifugal forces which pivot the pawls 120 and 122 outwardly into engagement with teeth 128 provided in a housing 130 associated with housing 106 to lock the shaft 104 and reel 108 against rotation in the unwinding direction.

Referring again to FIG. 1, it will be understood that opening movement of the door 16 moves the emergency release buckle 24 forward along the track 26 which in turn unwinds lap belt 20 from the retractor 22 and extends the shoulder belt 18 by forward movement of the carriage 56 along the track 32. This forward movement of the carriage 56 upon opening movement of the door unwinds cable 100 from the reel 108 at a rate of withdrawal which does not lock the locking mechanism 116. When the door 16 is closed, the emergency release buckle 24 moves rearwardly along the track 26 permitting rearward movement of the shoulder belt carriage 56 by the spiral spring 110 associated with the reel 108.

When the vehicle experiences a rapid deceleration, the seated occupant continues to move forwardly causing rapid forward movement of the shoulder belt 18 and carriage 56. The consequent rapid unwinding of the cable 100 from the reel 108 causes the pawls 120 and 122 to fly pivotally outward into engagement with the housing teeth 128 to block cable unwinding rotation of the reel 108. Attempted extension of the belt after the reel is locked induces tension in the cable 100 which pivots the pawl 86 upward against the bias of the torsion spring 88 and carries the pawl tooth 94 into engagement with the longitudinally spaced teeth 96 and 98 of the track 32. Thus, the pawl 86 is engaged with the track 32 to block continued forward movement of the upper end shoulder belt 18.

It will be understood that the reel locking mechanism of FIG. 4 is only one example of the many prior art reel locking devices which may be employed in the linear locking retractor of this invention. For example, a pendulum or ball type vehicle inertia sensitive locking mechanism may be associated with the cable reel 108 to affect lock-up of the reel. Furthermore, the reel locking mechanism may be of the dual-sensing type in which the reel is locked in response to either a vehicle deceleration condition or in response to unwinding of the belt.

An important feature of this invention is that the inertia locking mechanism of whatever type is fixed relative the vehicle body instead of being mounted on the belt carriage.

It will also be understood that the track 32 may have teeth along a portion of its length and no teeth along another portion to define locking and nonlocking ranges of movement of the belt carriage 56. Furthermore, the track 32 may be rectilinear as shown herein or may be curvilinear so that the belt end may traverse a curvilinear path similar to that of the track 26 within the door 16. It will be understood that the linear locking retractor of this invention may be oriented in any direction within the vehicle body as long as the reel locking mechanism is oriented in a fashion which will assure its acceptable operation. Furthermore, although the linear locking retractor shown herein has the belt attached directly to the carriage, the belt may traverse one or more pulleys as shown in U.S. Pat. No. 3,557,914, issued Jan. 26, 1971 to Tanaka and assigned to the assignee of this invention in order to provide a retractor in which a considerable length of belt may be stored. Thus, the invention is applicable to passive belt systems of the type shown in FIG. 1 wherein the object of the retractor is to move a belt end along a path of movement or in the prior art active belt systems where the retractor stores a length of belt.

Thus, the invention provides a new and improved means for transmitting a locking signal from a sensing means located at a fixed location on the vehicle body to a belt carriage which is movable relative the vehicle body.

The embodiments of the invention in which an exclusive property or privilege is claimed are defined as follows:

1. Mechanism for retracting a seat belt and locking the belt against extension comprising:
    a track;
    a belt carriage having the belt attached thereto and being mounted on the track for movement therealong in the belt extending direction and the belt retracting direction;
    locking means mounted on the belt carriage and adapted for actuation to a locked position engaging the track to lock the belt carriage against belt extending movement along the track;
    a reel;
    a flexible element having one end wound on the reel and the other end attached to the locking means;
    a winding spring rotating the reel in the direction to wind the flexible element and urge movement of the carriage along the track in the belt retracting direction;
    and reel locking means associated with the reel to lock the reel against rotation in the flexible element unwinding direction whereby the flexible element actuates the locking means to the locked position to lock the carriage against belt extending movement along the track.

2. Mechanism for retracting a seat belt and locking the belt against extension comprising:
    a longitudinally extending track having teeth spaced therealong;
    a belt carriage having the belt attached thereto and being mounted on the track for movement therealong in the belt extending direction and the belt retracting direction;
    a locking pawl pivotally mounted on the belt carriage and adapted for actuation to a locked position engaging the teeth of the track to lock the belt carriage against belt extending movement along the track;
    spring means urging the locking pawl to a normal unlocked position;
    a reel;
    a flexible element having one end wound on the reel and the other end attached to the locking pawl;
    a winding spring rotating the reel in the direction to wind the flexible element and pull the carriage along the track in the belt retracting direction;
    and locking means associated with the reel to lock the reel against rotation in the unwinding direction whereby the flexible element moves the locking pawl to the locking position against the bias of the spring means to lock the carriage against belt extending movement along the track.

3. The combination of claims 1 or 2 further characterized by the reel locking means associated with the reel being responsive to rapid unwinding of the flexible element to lock the reel against rotation in the unwinding direction.

* * * * *